(12) United States Patent
Koo et al.

(10) Patent No.: US 10,921,294 B2
(45) Date of Patent: Feb. 16, 2021

(54) SYSTEM FOR NON-DESTRUCTIVELY INSPECTING AND DETERMINING SEALING OF ALUMINUM POUCH BY USING ULTRASONIC WAVES

(71) Applicant: LG CHEM, LTD., Seoul (KR)

(72) Inventors: Sang Hyun Koo, Seoul (KR); Seok Jin Kim, Bucheon-si (KR); Cha Hun Ku, Yongin-si (KR)

(73) Assignee: LG Chem, Ltd.

( * ) Notice: Subject to any disclaimer, the term of this patent is extended or adjusted under 35 U.S.C. 154(b) by 115 days.

(21) Appl. No.: 16/325,507

(22) PCT Filed: Jan. 30, 2018

(86) PCT No.: PCT/KR2018/001291
§ 371 (c)(1),
(2) Date: Feb. 14, 2019

(87) PCT Pub. No.: WO2018/147586
PCT Pub. Date: Aug. 16, 2018

(65) Prior Publication Data
US 2019/0170703 A1 Jun. 6, 2019

(30) Foreign Application Priority Data
Feb. 9, 2017 (KR) .......... 10-2017-0018119

(51) Int. Cl.
*G01M 3/24* (2006.01)
*G01N 29/11* (2006.01)
(Continued)

(52) U.S. Cl.
CPC ..... *G01N 29/4445* (2013.01); *B29C 65/8292* (2013.01); *G01M 3/24* (2013.01);
(Continued)

(58) Field of Classification Search
CPC .. G01N 29/069; G01N 29/0609; G01N 29/11; G01N 29/36; G01N 29/4445;
(Continued)

(56) References Cited

U.S. PATENT DOCUMENTS 5,372,042 A 12/1994 Jarman et al.
6,840,108 B2 * 1/2005 Stauffer .............. G01L 3/24
73/40.5 A
(Continued)

FOREIGN PATENT DOCUMENTS

CN 20635494 U 8/2017
JP S60186753 A 9/1985
(Continued)

OTHER PUBLICATIONS

Inspection of Seal Integrity of Food Packages Using Ultrasound and Pressure Differential Techniques, Ayhan et al. (Year: 2001).*
(Continued)

*Primary Examiner* — Jacques M Saint Surin
(74) *Attorney, Agent, or Firm* — Lerner, David, Littenberg, Krumholz & Mentlik, LLP (57) ABSTRACT

A non-destructive inspection judgment system for inspecting a non-destructive inspection subject using ultrasonic waves, including an ultrasonic wave generator transmitting and receiving ultrasonic signals by generating ultrasonic waves to the non-destructive inspection subject placed on an inspection table, an interface transmitting an ultrasonic signal received from the ultrasonic wave generator to an ultrasonic wave generation data controller, the ultrasonic wave generation data controller processing ultrasonic wave data received from the interface, a sealing defect presence judger determining, using the processed ultrasonic wave data, whether a sealing defect is present, and a display displaying a result of the judgment on a monitor to detect an unsealed portion of an aluminum pouch.

9 Claims, 5 Drawing Sheets

(51) Int. Cl.
  *G01N 29/04* (2006.01)
  *G01N 29/36* (2006.01)
  *G01N 29/44* (2006.01)
  *G01N 29/06* (2006.01)
  *B29C 65/82* (2006.01)

(52) U.S. Cl.
  CPC ....... *G01N 29/043* (2013.01); *G01N 29/0609* (2013.01); *G01N 29/069* (2013.01); *G01N 29/11* (2013.01); *G01N 29/36* (2013.01); *G01N 2291/015* (2013.01); *G01N 2291/0235* (2013.01); *G01N 2291/0289* (2013.01); *G01N 2291/048* (2013.01); *G01N 2291/102* (2013.01); *G01N 2291/267* (2013.01); *G01N 2291/2632* (2013.01); *G01N 2291/2677* (2013.01); *G01N 2291/2695* (2013.01)

(58) Field of Classification Search
  CPC ... G01N 29/043; G01M 3/24; B29C 66/1122; B29C 66/43; B29C 65/02; B29C 66/72321; B29C 65/76; B29C 65/8253; B29C 66/71; B29C 65/8292; B29C 66/433; B29C 66/43121
  USPC .......................................................... 73/632
  See application file for complete search history.

(56) References Cited

U.S. PATENT DOCUMENTS

| | | | | |
|---|---|---|---|---|
| 7,036,287 | B1 * | 5/2006 | Webb | G01N 21/8806 53/53 |
| 7,272,916 | B2 * | 9/2007 | Webb | G01M 3/38 53/53 |
| 9,448,208 | B2 * | 9/2016 | Stauffer | G01N 29/221 |
| 2003/0226402 | A1 | 12/2003 | Leybovich | |
| 2004/0083814 | A1 | 5/2004 | Lehmann et al. | |
| 2004/0129081 | A1 | 7/2004 | Stauffer | |
| 2010/0116058 | A1 | 5/2010 | Cheng | |

FOREIGN PATENT DOCUMENTS

| | | | |
|---|---|---|---|
| JP | H08310516 | A | 11/1996 |
| JP | 2717550 | B2 | 2/1998 |
| JP | 2912159 | B2 | 6/1999 |
| JP | 2000180146 | * | 6/2000 |
| JP | 2005-201894 | A | 7/2005 |
| JP | 2010-101780 | A | 5/2010 |
| JP | 4981233 | B2 | 7/2012 |
| JP | 2015-145785 | A | 8/2015 |
| KR | 10-2007-0058074 | A | 6/2007 |
| KR | 10-2009-0046393 | A | 5/2009 |
| KR | 10-0931370 | B1 | 12/2009 |
| KR | 10-2008-0109947 | A | 8/2010 |
| KR | 10-0973482 | B1 | 8/2010 |
| KR | 10-2011-0015804 | A | 2/2011 |
| KR | 10-2012-0096621 | A | 8/2012 |
| KR | 10-2013-0126724 | A | 11/2013 |
| KR | 10-2015-0047017 | A | 5/2015 |
| KR | 10-2016-0063375 | A | 6/2016 |

OTHER PUBLICATIONS

Extended European Search Report corresponding to European Patent Application No. 18751271.0, dated May 17, 2019, 8 pages.
International Search Report (PCT/ISA/210) issued in PCT/KR2018/001291, dated Sep. 21, 2018.

* cited by examiner

SYSTEM FOR NON-DESTRUCTIVELY INSPECTING AND DETERMINING SEALING OF ALUMINUM POUCH BY USING ULTRASONIC WAVES

TECHNICAL FIELD

The present invention relates to a non-destructive inspection judgment system for aluminum pouch sealing using ultrasonic waves in which, using transmittance of ultrasonic waves, a region with a high density (sealed part) at a transmitting portion with a high transmittance is displayed in red, and a region with a low density (air part) at a transmitting portion with a low transmittance is displayed in blue so that an unsealed portion of an aluminum pouch is detected and checked through a non-destructive inspection, the non-destructive inspection judgment system includes an ultrasonic wave generation data controller including processing software that detects an unsealed portion in a portion of an aluminum pouch that has been sealed through a non-destructive inspection using ultrasonic waves, sets a judgment reference value since a length of a sealing width is measurable, processes measurement data, and performs automatic judgment, a sealing defect presence judger, and a display so that judgment upon a non-destructive and non-contact inspection is automated, and a gas leakage that occurs due to weak sealing or a failure in side trimming during a process and ventilation that occurs to the outside due to an internal pressure of a cell are prevented through the non-destructive inspection for aluminum pouch sealing, a bubble judger is placed in the sealing defect presence judger so that judgment reference values for setting inspection regions at bottom, left, and right portions by moving two horizontal and vertical shafts of ultrasonic inspection equipment are set and thus, after the non-destructive inspection, a "no-good" position may be checked from a change in the number of dots through movement of regions, a width judger configured to measure sections at positions of 20 shafts at bottom, left, and right portions is placed in the sealing defect presence judger so that, when a length of a section having a specific output value or larger from among the measured sections is converted into a width in the ultrasonic inspection equipment, and the measured width length is shown to have specifications inferior to reference specifications, the situation is determined as "no-good," and whether an aluminum pouch is sealed is measured after a filtering value and a probe frequency are set in the ultrasonic inspection equipment so that, from a result of checking a cross-section having a sealing width length of a formed pouch, whether the formed pouch matches color regions of an ultrasonic inspection may be checked, and a probe line within an inspection section may be moved to check measurement value data, thereby allowing a "no-good" portion to be checked with visual inspection.

RELATED ART

As technology development and demand for mobile devices have increased, there has been a rapid increase in demand for secondary batteries as energy sources, and among such secondary batteries, lithium secondary batteries, which exhibit high energy density and operating potential, long cycle life, and low self-discharge rate, have been commercialized and widely used.

In recent years, there has been a growing interest in environmental issues, and as a result, research on electric vehicles (EVs), hybrid electric vehicles (HEVs), and the like that can replace fossil-fueled vehicles such as gasoline vehicles and diesel vehicles, which are some of the main causes of air pollution, has been carried out. Although nickel-metal hydride (Ni-MH) secondary batteries are mainly used as power sources for electric vehicles (EV), hybrid electric vehicles (HEV), and the like, research on using lithium secondary batteries having high energy density, high discharge voltage and high output stability as power sources for electric vehicles (EV), hybrid electric vehicles (HEV), and the like have been vigorously carried out, and some of the lithium secondary batteries have been commercialized.

The lithium secondary battery has a structure in which a non-aqueous electrolyte containing a lithium salt is impregnated in an electrode assembly having a porous separator interposed between a positive electrode and a negative electrode, each of which is coated with an active material on a current collector.

The electrode assembly that has a structure consisting of a positive electrode, a separator, and a negative electrode to form a secondary battery is mainly classified into types such as a jelly-roll type (winding type), a stack type (stacked type) and a stack/folding type, which is a type in which the jelly-roll type and the stack type are combined, in accordance with a structure thereof.

Such an electrode assembly includes an electrode tab for connection with an external terminal at each electrode. In an assembly process, such an electrode tab is coupled to an electrode lead for connection with an external terminal by welding.

In this case, ultrasonic welding is mainly used for the welding. This is because, when resistance welding, laser welding, or the like is used, the performance of the battery may be degraded due to application of excessive energy to the electrode assembly.

When the welding strength between the electrode tab and the electrode lead is too low in such welding, the welded portion may be separated in the process of combining a battery module or a battery pack using a battery cell. When a welding portion between a tab and a lead is separated in a battery module or a battery pack manufactured by connecting a plurality of battery cells in series or in parallel, since the entire battery pack may fail to exhibit its function, this is considered to be a serious defect.

In order to confirm whether a failure has occurred in such ultrasonic welding, heretofore, a battery cell sample has been extracted, and whether a failure has occurred has been determined through a destructive inspection such as a shear test.

However, in such a case, since inspection of every battery cell is not possible, there is a problem in that it is not possible to guarantee that a failure will not occur in a battery cell which is not selected as a sample for checking.

In the ultrasonic excitation infrared thermal imaging technique, ultrasonic waves in the range of 20 to 40 kHz are incident on a test body having a failure, and some of the elastic energy of the incident ultrasonic waves is converted into thermal energy due to the thermoelastic effect at a coupling part. In this case, an infrared thermal imaging camera is synchronized with oscillated ultrasonic waves to measure temperature distribution of the test body and detect the failure.

Ultrasonic waves generated by an ultrasonic oscillator are focused at an end of a tool horn by the tool horn, and the ultrasonic waves are transmitted to the test body due to contact between the test body and the tool horn. Since a metal horn used in a conventional ultrasonic welder is used without change as the tool horn, which is currently used in the ultrasonic excitation infrared thermal imaging technique, the tool horn is designed to maximize the ultrasonic waves being focused on the contact surface.

However, in the ultrasonic excitation infrared thermal imaging technique, it is preferable that, in detecting a defect present in a test body, the incident ultrasonic waves are scattered throughout the test body rather than being focused on the contact surface. In addition, there is a problem that the high output ultrasonic waves at the end of the tool horn which is currently used may cause surface damage on the contact surface of the test body.

Further, in the design of the metal tool horn, the length of the tool horn should be designed to be one half of the wavelength of the oscillating ultrasonic waves physically, and there is a problem in that such design causes an increase in the size of an ultrasonic excitation apparatus.

In the conventional case, although it is possible to detect the unsealed portion through the non-destructive inspection on the sealed portion of the aluminum pouch and measure the length of the sealing width, there is a problem in that, since there is no software for processing measurement data, judgment has to be performed after a measurer directly checks all data.

Thus, there is an urgent need for the development of a non-destructive inspection judgment system for aluminum pouch sealing using ultrasonic waves in which, using transmittance of ultrasonic waves, a region with a high density (sealed part) at a transmitting portion with a high transmittance is displayed in red, and a region with a low density (air part) at a transmitting portion with a low transmittance is displayed in blue so that an unsealed portion of an aluminum pouch is detected and checked through a non-destructive inspection, the non-destructive inspection judgment system includes an ultrasonic wave generation data controller including processing software that detects an unsealed portion in a portion of an aluminum pouch that has been sealed through a non-destructive inspection using ultrasonic waves, sets a judgment reference value since a length of a sealing width is measurable, processes measurement data, and performs automatic judgment, a sealing defect presence judger, and a display so that judgment upon a non-destructive and non-contact inspection is automated, and a gas leakage that occurs due to weak sealing or a failure in side trimming during a process and ventilation that occurs to the outside due to an internal pressure of a cell are prevented through the non-destructive inspection for aluminum pouch sealing, a bubble judger is placed in the sealing defect presence judger so that judgment reference values for setting inspection regions at bottom, left, and right portions by moving two horizontal and vertical shafts of ultrasonic inspection equipment are set and thus, after the non-destructive inspection, a "no-good" position may be checked from a change in the number of dots through movement of regions, and a width judger configured to measure sections at positions of 20 shafts at bottom, left, and right portions is placed in the sealing defect presence judger so that, when a length of a section having a specific output value or larger from among the measured sections is converted into a width in the ultrasonic inspection equipment, and the measured width length is shown to have specifications inferior to reference specifications, the situation is determined as "no-good."

DISCLOSURE

Technical Problem

The present invention has been devised to solve the above-mentioned problems, and it is an aspect of the present invention to provide a non-destructive inspection judgment system for aluminum pouch sealing using ultrasonic waves in which, using transmittance of ultrasonic waves, a region with a high density (sealed part) at a transmitting portion with a high transmittance is displayed in red, and a region with a low density (air part) at a transmitting portion with a low transmittance is displayed in blue so that an unsealed portion of an aluminum pouch is detected and checked through a non-destructive inspection.

It is another aspect of the present invention to provide a non-destructive inspection judgment system for aluminum pouch sealing using ultrasonic waves, the non-destructive inspection judgment system including an ultrasonic wave generation data controller including processing software that detects an unsealed portion in a portion of an aluminum pouch that has been sealed from a sealed portion of an aluminum pouch through a non-destructive inspection using ultrasonic waves, sets a judgment reference value since a length of a sealing width is measurable, processes measurement data, and performs automatic judgment, a sealing defect presence judger, and a display so that judgment upon a non-destructive and non-contact inspection is automated.

It is still another aspect of the present invention to provide a non-destructive inspection judgment system for aluminum pouch sealing using ultrasonic waves in which a gas leakage that occurs due to weak sealing or a failure in side trimming during a process and ventilation that occurs to the outside due to an internal pressure of a cell are prevented through a non-destructive inspection for aluminum pouch sealing.

It is yet another aspect of the present invention to provide a non-destructive inspection judgment system for aluminum pouch sealing using ultrasonic waves in which a bubble judger is placed in the sealing defect presence judger so that judgment reference values for setting inspection regions at bottom, left, and right portions by moving two horizontal and vertical shafts of ultrasonic inspection equipment are set and thus, after the non-destructive inspection, a "no-good" position may be checked from a change in the number of dots through movement of regions.

It is yet another aspect of the present invention to provide a non-destructive inspection judgment system for aluminum pouch sealing using ultrasonic waves in which a width judger configured to measure sections at positions of 20 shafts at bottom, left, and right portions is placed in the sealing defect presence judger so that, when a length of a section having a specific output value or larger from among the measured sections is converted into a width in the ultrasonic inspection equipment, and the measured width length is shown to have specifications inferior to reference specifications, the situation is determined as "no-good."

It is yet another aspect of the present invention to provide a non-destructive inspection judgment system for aluminum pouch sealing using ultrasonic waves in which whether an aluminum pouch is sealed is measured after a filtering value and a probe frequency are set in the ultrasonic inspection equipment so that, from a result of checking a cross-section having a sealing width length of a formed pouch, whether the formed pouch matches color regions of an ultrasonic inspection may be checked, and a probe line within an inspection section may be moved to check measurement value data, thereby allowing a "no-good" portion to be checked with visual inspection.

Technical Solution

To achieve the above aspects, a non-destructive inspection judgment system for sealing of a non-destructive inspection subject using ultrasonic waves includes an ultrasonic wave generator formed of probes configured to transmit and receive ultrasonic signals by generating ultrasonic waves to the non-destructive inspection subject placed on an inspection table, an interface configured to transmit an ultrasonic signal received from the ultrasonic wave generator to an ultrasonic wave generation data controller, the ultrasonic wave generation data controller configured to process ultrasonic wave data received from the interface, a sealing defect presence judger configured to judge, using the processed ultrasonic wave data, whether a sealing defect is present, and a display configured to display a result of the judgment on a monitor cause a result of the judgment to be displayed on a monitor of the display.

The ultrasonic wave generator may include an ultrasonic pulse generator-transmitter configured to generate ultrasonic waves and irradiate the non-destructive inspection subject with an ultrasonic signal, a preamplifier configured to amplify an output of the ultrasonic signal from the ultrasonic pulse generator-transmitter, and an ultrasonic pulse generation signal receiver configured to receive the amplified ultrasonic signal and transmit the received ultrasonic signal to the interface.

The non-destructive inspection judgment system for aluminum pouch sealing using ultrasonic waves may further include a conveyor configured to convey the non-destructive inspection subject to the inspection table.

The probes of the ultrasonic wave generator may include a set of a transmission probe and a receiving probe.

The sealing defect presence judger may include a bubble judger configured to set inspection regions at bottom, left, and right portions by moving two horizontal and vertical shafts of the inspection regions of ultrasonic inspection equipment to set judgment reference values, and a width judger configured to measure sections at positions of 20 shafts at bottom, left, and right portions of the inspection regions in the ultrasonic inspection equipment and convert a length of a section having a specific output value or larger from among the measured sections into a width.

In the ultrasonic inspection equipment, a frequency of each of the transmission probe and the receiving probe may be 715 kHz or 800 kHz.

The non-destructive inspection subject may include an aluminum pouch.

Non-destructive inspection items may include a sealing width length and a length of a temporarily-attached part including polybeads.

Types of sealing failures of the non-destructive inspection subject may include leakage in which a natural electrolyte is generated, and a gas leakage phenomenon occurs, and ventilation in which an electrolyte is generated due to an internal pressure of a cell of the non-destructive inspection subject, and a gas leakage phenomenon occurs.

The non-destructive inspection subject can be a packaged pouch. Sealing states in accordance with the types of sealing failure may include a state in which sealing is weak and thus boundaries of polypropylene (PP) welding surfaces at upper and lower parts of the packaged pouch are stripped, a state in which a sealing section due to side trimming is not present and thus a PP welding part is not present, and a state in which sealing is excessive and thus a PP layer has been stripped from an aluminum layer of the packaged pouch after a crack occurred in the polybeads of the temporarily-attached part.

Upon a sealing process inspection being carried out in a sample inspection, measurement items may include a sealing width length and a size of bubbles.

To perform automatic judgment in a non-destructive inspection for aluminum pouch sealing, inspection of at least one of a side surface and a bottom surface of the aluminum pouch after final sealing is performed, and inspection of at least one of a side surface and a bottom surface of the aluminum pouch after degassing and resealing are performed.

Effects of the Invention

The non-destructive inspection judgment system for aluminum pouch sealing using ultrasonic waves according to the present invention has the following advantageous effects.

First, since using transmittance of ultrasonic waves, a region with a high density (sealed part) at a transmitting portion with a high transmittance is displayed in red, and a region with a low density (air part) at a transmitting portion with a low transmittance is displayed in blue, and an unsealed portion of an aluminum pouch can be detected and checked through a non-destructive inspection.

Second, since the non-destructive inspection judgment system includes an ultrasonic wave generation data controller including processing software that detects an unsealed portion in a portion of an aluminum pouch that has been sealed through a non-destructive inspection using ultrasonic waves, sets a judgment reference value since a length of a sealing width is measurable, processes measurement data, and performs automatic judgment, a sealing defect presence judger, and a display, judgment upon a non-destructive and non-contact inspection can be automated.

Third, a gas leakage that occurs due to weak sealing or a failure in side trimming during a process and ventilation that occurs to the outside due to an internal pressure of a cell can be prevented through a non-destructive inspection for aluminum pouch sealing.

Fourth, by a bubble judger placed in the sealing defect presence judger, judgment reference values for setting inspection regions at bottom, left, and right portions by moving two horizontal and vertical shafts of ultrasonic inspection equipment can be set and thus, after the non-destructive inspection, a "no-good" position can be checked from a change in the number of dots through movement of regions.

Fifth, by a width judger, which is configured to measure sections at positions of 20 shafts at bottom, left, and right portions, placed in the sealing defect presence judger, when a length of a section having a specific output value or larger from among the measured sections is converted into a width in the ultrasonic inspection equipment, and the measured width length is shown to have specifications inferior than reference specifications, the situation can be determined as "no-good."

Sixth, since whether an aluminum pouch is sealed is measured after a filtering value and a probe frequency are set in the ultrasonic inspection equipment, from a result of checking a cross-section having a sealing width length of a formed pouch, whether the formed pouch matches color regions of an ultrasonic inspection can be checked, and a probe line within an inspection section can be moved to check measurement value data, thereby allowing a "no-good" portion to be checked with visual inspection.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE PREFERRED EMBODIMENTS

Hereinafter, exemplary embodiments of the present invention will be described with reference to the accompanying drawings. When it is determined that detailed description on known art or configuration related to the present invention may unnecessarily obscure the gist of the present invention, the detailed description thereon will be omitted. The terms to be described below are terms defined in consideration of functions in the present invention, and since the terms may vary in accordance with intentions, practices, or the like of a user or an operator, the terms should be defined on the basis of content throughout the present specification in which a non-destructive inspection judgment system for aluminum pouch sealing using ultrasonic waves, which is the present invention, is described.

Figure 1:
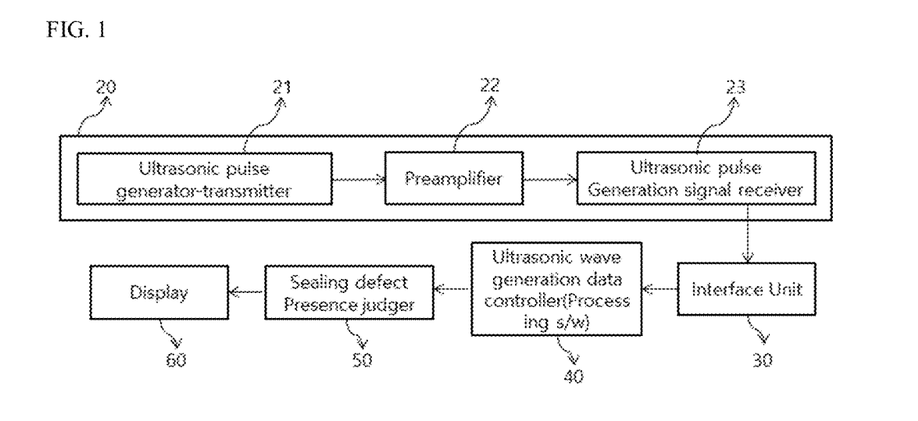
FIG. 1 is a block diagram for describing configuration of a non-destructive inspection judgment system for aluminum pouch sealing using ultrasonic waves according to an embodiment of the present invention.
Figure 2:
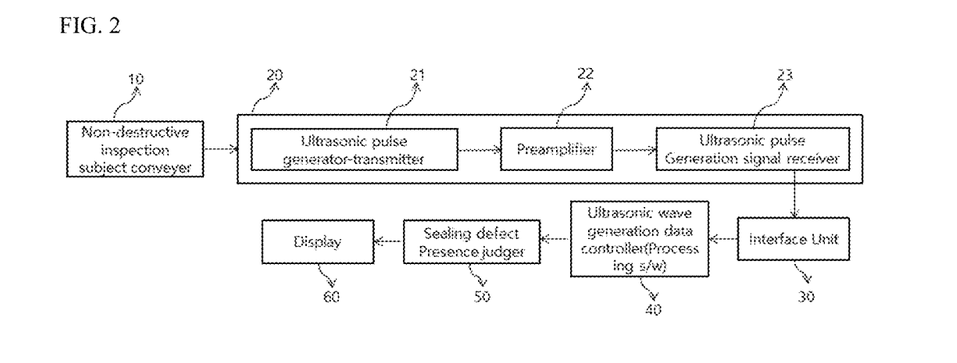
FIG. 2 is a block diagram for describing configuration of a non-destructive inspection judgment system for aluminum pouch sealing using ultrasonic waves according to another embodiment of the present invention.
Figure 3:
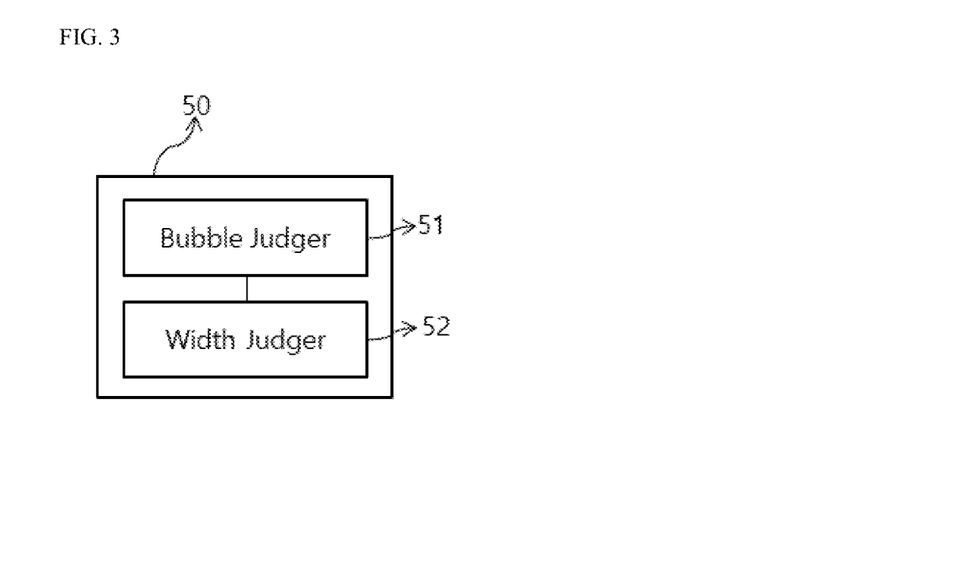
FIG. 3 is a view illustrating detailed configuration of a sealing defect presence judger, which is one of configurations of the non-destructive inspection judgment system for aluminum pouch sealing using ultrasonic waves according to the other embodiment of the present invention.
Figure 4:
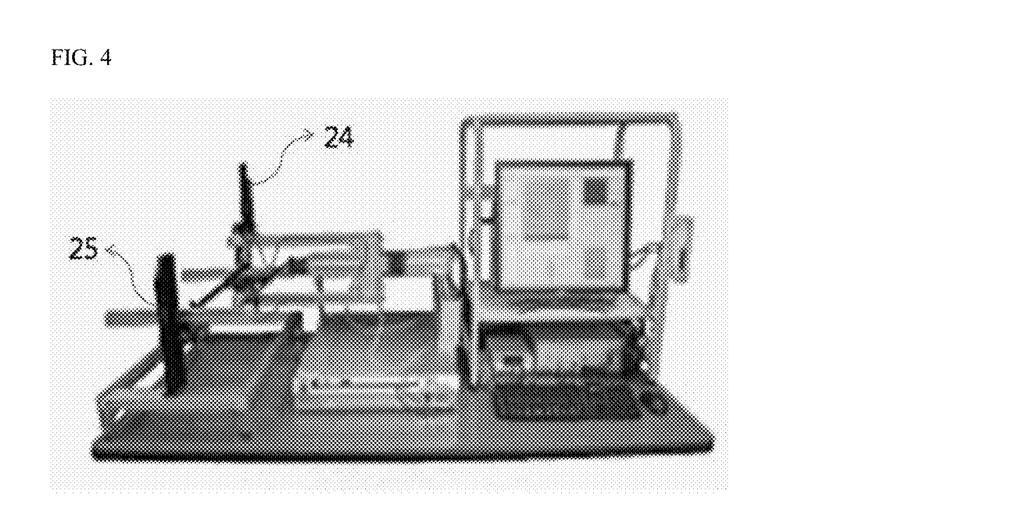
FIG. 4 is a photograph schematically showing ultrasonic inspection equipment including the non-destructive inspection judgment system for aluminum pouch sealing using ultrasonic waves according to an embodiment of the present invention.
Figure 5:
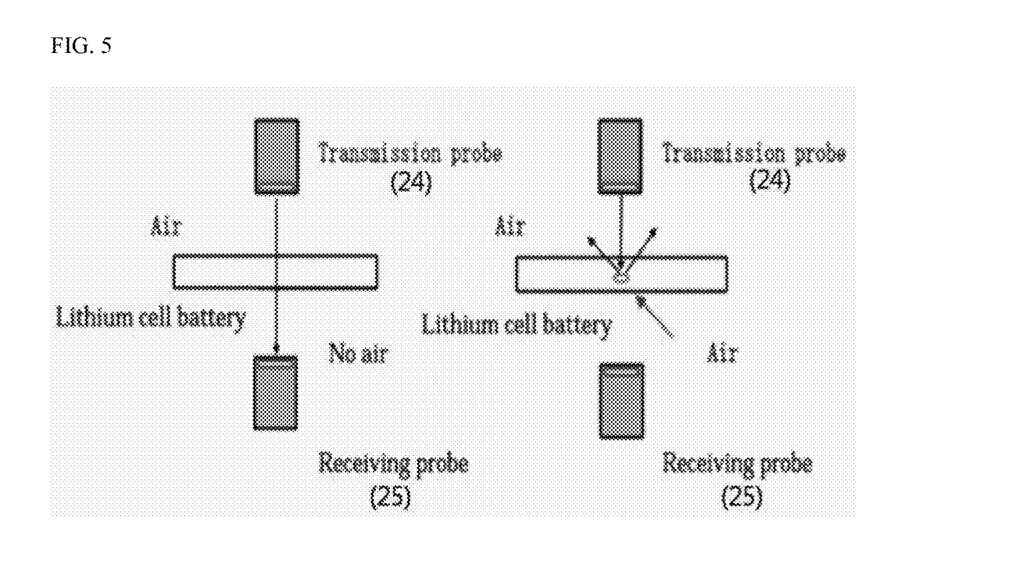
FIG. 5 is a view for describing transmission and reception states of ultrasonic inspection equipment including a transmission probe and a receiving probe when an air part is present and when the air part is not present according to an embodiment of the present invention.
Figure 6:
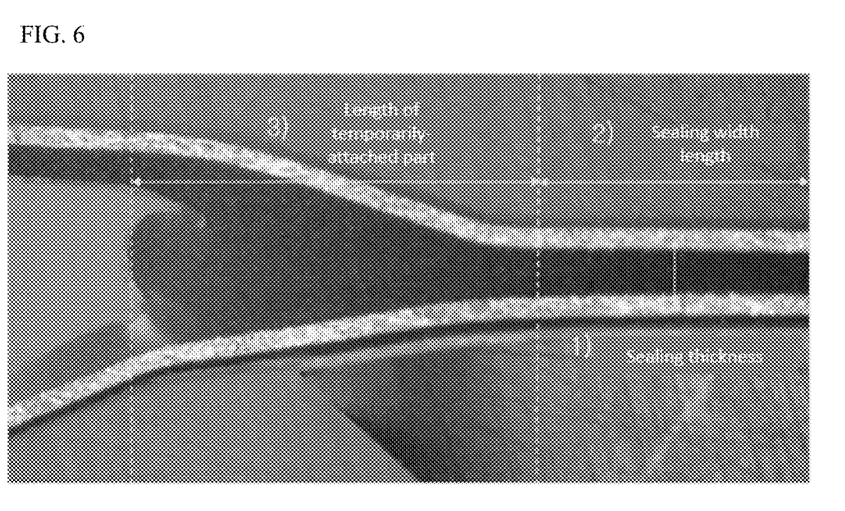
FIG. 6 is a photograph showing inspection items upon a non-destructive inspection using the ultrasonic inspection equipment according to an embodiment of the present invention.
Figure 7:
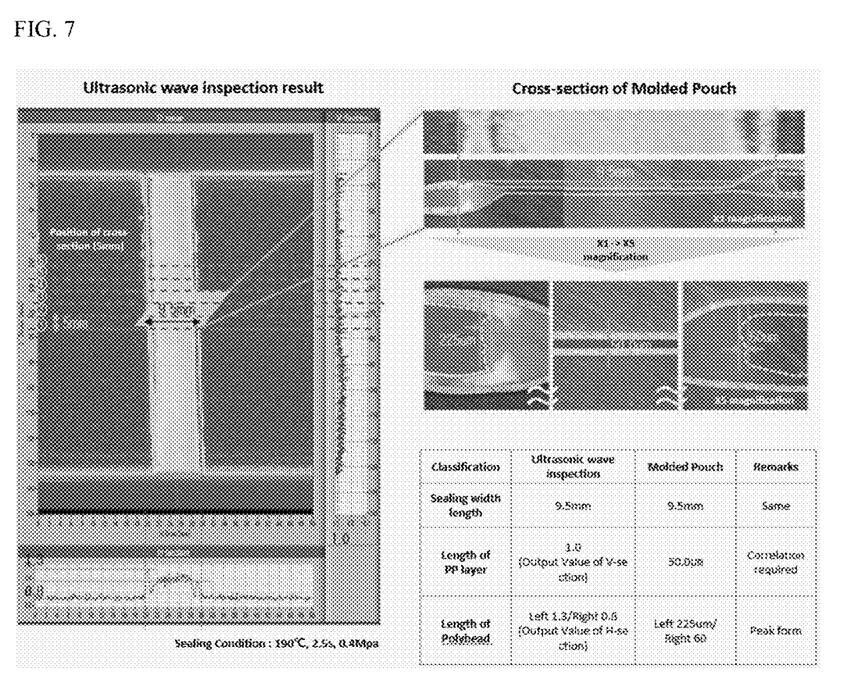
FIG. 7 is a photograph showing cross-sections in a width direction as a result of sealing a formed pouch according to an embodiment of the present invention.
Figure 8:
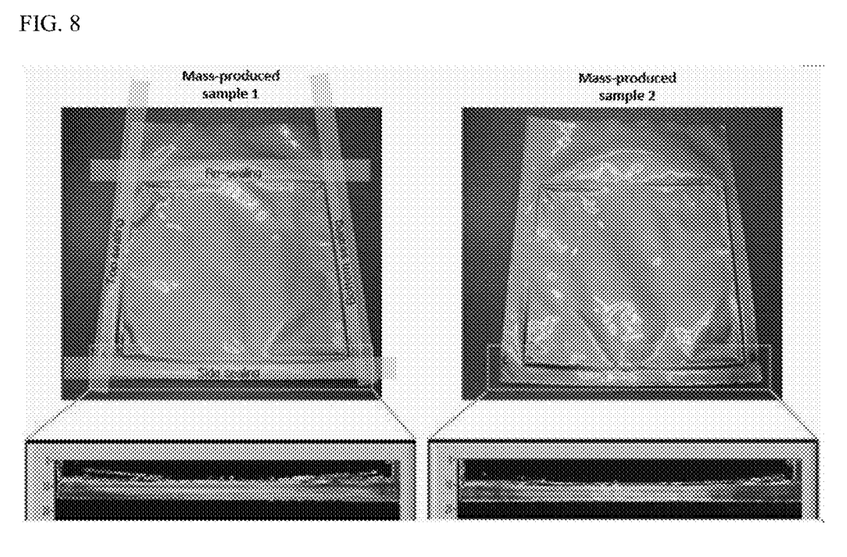
FIG. 8 is a photograph showing sealing states of mass-produced samples which are sealed and resealed according to an embodiment of the present invention.
Figure 9:
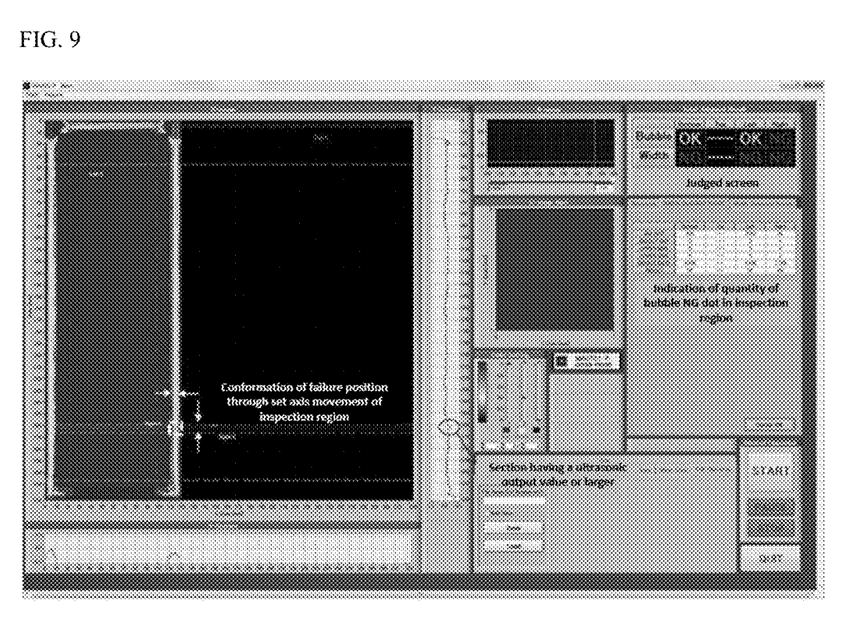
FIG. 9 is a photograph showing a state in which a result of judging bubbles in mass-produced samples is shown on a screen of a display according to an embodiment of the present invention.
Figure 10:
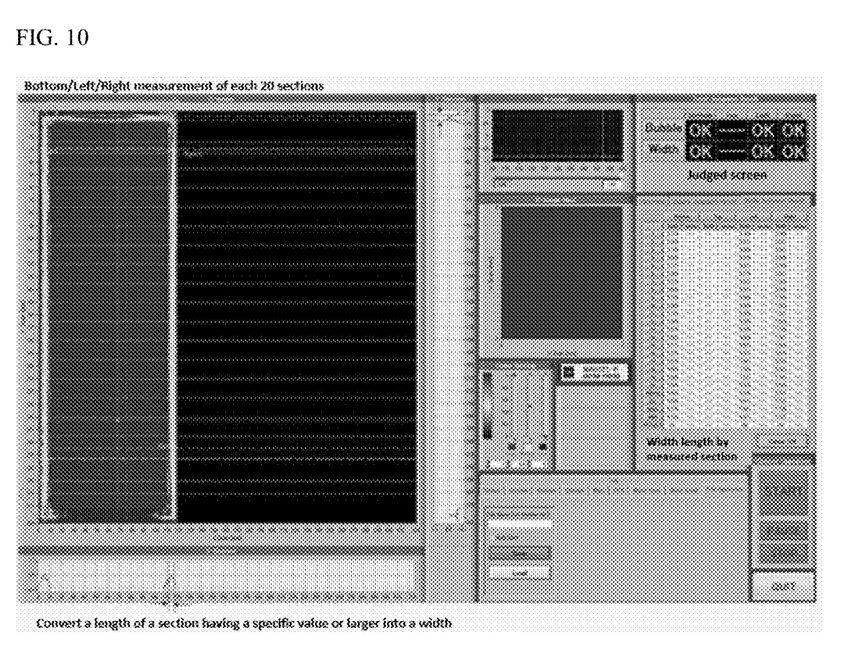
FIG. 10 is a photograph showing a state in which a result of judging widths in mass-produced samples is shown on the screen of the display according to an embodiment of the present invention.

FIG. 1 is a block diagram for describing configuration of a non-destructive inspection judgment system for aluminum pouch sealing using ultrasonic waves according to an embodiment of the present invention; FIG. 2 is a block diagram for describing configuration of a non-destructive inspection judgment system for aluminum pouch sealing using ultrasonic waves according to another embodiment of the present invention; FIG. 3 is a view illustrating detailed configuration of a sealing defect presence judger, which is one of configurations of the non-destructive inspection judgment system for aluminum pouch sealing using ultrasonic waves according to the other embodiment of the present invention; FIG. 4 is a photograph schematically showing ultrasonic inspection equipment including the non-destructive inspection judgment system for aluminum pouch sealing using ultrasonic waves according to an embodiment of the present invention; FIG. 5 is a view for describing transmission and reception states of ultrasonic inspection equipment including a transmission probe and a receiving probe when an air part is present and when the air part is not present according to an embodiment of the present invention; FIG. 6 is a photograph showing inspection items upon a non-destructive inspection using the ultrasonic inspection equipment according to an embodiment of the present invention; FIG. 7 is a photograph showing cross-sections in a width direction as a result of sealing a formed pouch according to an embodiment of the present invention; FIG. 8 is a photograph showing sealing states of mass-produced samples which are sealed and resealed according to an embodiment of the present invention; FIG. 9 is a photograph showing a state in which a result of judging bubbles in mass-produced samples is shown on a screen of a display according to an embodiment of the present invention; and FIG. 10 is a photograph showing a state in which a result of judging widths in mass-produced samples is shown on the screen of the display according to an embodiment of the present invention.

The non-destructive inspection judgment system for aluminum pouch sealing using ultrasonic waves comprises a non-destructive inspection subject conveyer 10, an ultrasonic wave generator 20, an ultrasonic pulse generator-transmitter 21, a preamplifier 22, an ultrasonic pulse generation signal receiver 23, a transmission probe 24, a receiving probe 25, an interface 30, an ultrasonic wave generation data controller 40, a sealing defect presence judger 50, a bubble judger 51, a width judger 52, a display 60, etc.

As illustrated in FIG. 1 to FIG. 6, the non-destructive inspection judgment system for aluminum pouch sealing using ultrasonic waves comprises an ultrasonic wave generator 20 formed of probes configured to transmit and receive ultrasonic signals by generating ultrasonic waves to a non-destructive inspection subject placed on an inspection table; an interface 30 configured to transmit an ultrasonic signal received from the ultrasonic wave generator 20 to an ultrasonic wave generation data controller; an ultrasonic wave generation data controller 40 configured to process ultrasonic wave data received from the interface 30; a sealing defect presence judger 50 configured to judge, using the processed ultrasonic wave data, whether a sealing defect is present; and a display 60 configured to display a result of the judgment on a monitor, and further comprises a non-destructive inspection subject conveyer 10 configured to convey the non-destructive inspection subject to an inspection table.

Moreover, functions of technical means of the non-destructive inspection judgment system for aluminum pouch sealing using ultrasonic waves are described below.

The non-destructive inspection subject conveyer 10 is configured to convey a non-destructive inspection subject to an inspection table. Wherein, the non-destructive inspection subject is an aluminum pouch.

The ultrasonic wave generator 20 generates ultrasonic waves to non-destructive inspection subject on an inspection table, and composed of probes which transmit and receive ultrasonic signals.

Wherein, the ultrasonic wave generator 20 comprises an ultrasonic pulse generator-transmitter 21 configured to generate ultrasonic waves and irradiate the non-destructive inspection subject with an ultrasonic signal; a preamplifier 22 configured to amplify an output of the ultrasonic signal from the ultrasonic pulse generator-transmitter 21; and an ultrasonic pulse generation signal receiver 23 configured to receive the amplified ultrasonic signal and transmit the received ultrasonic signal to the interface 30.

In addition, as illustrated in FIG. 5, the probes of the ultrasonic wave generator 20 comprise a set of a transmission probe 24 and a receiving probe 25.

Moreover, as illustrated in FIG. 4, in the ultrasonic inspection equipment, a frequency of each of the transmission probe and the receiving probe is 715 kHz or 800 kHz, and after a filtering value and a probe frequency are set in the ultrasonic inspection equipment so that, from a result of checking a cross-section having a sealing width length of a formed pouch, whether the formed pouch matches color regions of an ultrasonic inspection may be checked, and a probe line within an inspection section may be moved to check measurement value data, thereby allowing a "no-good" portion to be checked with visual inspection.

The interface 30 configured to convey ultrasonic signals transmitted from the ultrasonic wave generator 20 to an ultrasonic wave generation data controller 40.

The ultrasonic wave generation data controller 40 configured to process ultrasonic data transmitted from the interface 30.

The sealing defect presence judger 50 configured to judge sealing defect presence by the processed ultrasonic data.

Wherein, the sealing defect presence judger 50 comprises a bubble judger 51 configured to set inspection regions at bottom, left, and right portions by moving two horizontal and vertical shafts of the inspection regions of ultrasonic inspection equipment to set judgment reference values; and a width judger 52 configured to measure sections at positions of 20 shafts at bottom, left, and right portions of the inspection regions in the ultrasonic inspection equipment and convert a length of a section having a specific output value or larger from among the measured sections into a width.

Also, a bubble judger 51 is placed in the sealing defect presence judger so that judgment reference values for setting inspection regions at bottom, left, and right portions by moving two horizontal and vertical shafts of ultrasonic inspection equipment are set, and thus after the non-destructive inspection, a "no-good" position may be checked from a change in the number of dots through movement of regions.

Moreover, a width judger configured to measure sections at positions of 20 shafts at bottom, left, and right portions is placed in the sealing defect presence judger 50 so that, when a length of a section having a specific output value or larger from among the measured sections is converted into a width in the ultrasonic inspection equipment, and the measured width length is shown to have specifications inferior to reference specifications, the situation is determined as "no-good".

The display 60 configured to display the judged result on a monitor.

As described above, in the non-destructive inspection judgment system for aluminum pouch sealing using ultrasonic waves, non-destructive inspection items which use non-destructive inspection equipment, as illustrated in FIG. 6, is a polybead length 3 including a sealing thickness 1, a sealing width length 2, and a polybead, and in a sealing process inspection being carried out in a sample inspection, measurement items comprise a sealing width length and a size of bubbles.

In addition, types of sealing failure comprise leakage in which a natural electrolyte is generated and a gas leakage phenomenon occurs, and ventilation in which an electrolyte is generated due to an internal pressure of a cell and a gas leakage phenomenon occurs.

Also, sealing states in accordance with the types of sealing failure comprise a state in which sealing is weak, and thus boundaries of polypropylene (PP) welding surfaces at upper and lower parts of a packaged pouch are stripped, a state in which a sealing section due to side trimming is not present, and thus a PP welding part is not present, and a state in which sealing is excessive, and thus a PP layer has been stripped from an aluminum layer after a crack occurred in the polybeads of the temporarily-attached part. In these cases, standard of tensile force is not proper, thereby standard of bubble is not proper.

As described above, the non-destructive inspection judgment system for aluminum pouch sealing using ultrasonic waves has final goal to Inline complete automatic inspection, and thus tact time, turn table idle, judge logic, etc. should be considered, and because of this, a non-destructive inspection automatic judgment system is needed. In order to perform automatic judgment in a non-destructive inspection for aluminum pouch sealing, a side, a bottom of a packaged sample, one site thereof after final sealing is performed, and one site thereof after degassing and resealing are performed are inspectable.

FIG. 7 is a photograph showing cross-sections in a width direction as a result of sealing a formed pouch according to an embodiment of the present invention.

As illustrated in FIG. 7, it analyzes cross-sections in width direction as a result of sealing a formed pouch through ultrasonic wave inspection result, and sealing width length of the ultrasonic wave inspection and the formed were the same as 9.5 mm, a pp layer thickness should be revised, a polybead length is in peak form in a formed pouch.

FIG. 8 is a photograph showing sealing states of mass-produced samples which are sealed and resealed according to an embodiment of the present invention.

As illustrated in FIG. 8, sealing states of mass-produced samples which are sealed and resealed, in regard of mass-produced sample 1 and mass-produced sample 2, tested in proper probe frequency is 800 kHz, as shown in cross-section in the bottom were good.

FIG. 9 is a photograph showing a state in which a result of judging bubbles in mass-produced samples is shown on a screen of a display according to an embodiment of the present invention.

As illustrated in FIG. 9, a result of judging bubbles in mass-produced samples is shown on a screen of a display, the judged result is on the judged screen bottom and left were "OK" and right was "no good".

FIG. 10 is a photograph showing a state in which a result of judging widths in mass-produced samples is shown on the screen of the display according to an embodiment of the present invention.

As illustrated in FIG. 10, a result of judging widths in mass-produced samples is shown on the screen of the display, and 20 shafts of each bottom, left, and right were measured, in judged result of width and bubble, bottom, left, and right were all judged "OK".

Therefore, the non-destructive judgment system for aluminum pouch sealing using ultrasonic waves of the present invention using transmittance of ultrasonic waves, a region with a high density (sealed part) at a transmitting portion with a high transmittance is displayed in red, and a region with a low density (air part) at a transmitting portion with a low transmittance is displayed in blue, and an unsealed portion of an aluminum pouch can be detected and checked through a non-destructive inspection. Also, an unsealed portion in a portion of an aluminum pouch that has been sealed through a non-destructive inspection using ultrasonic waves, sets a judgment reference value since a length of a sealing width is measurable, processes measurement data, and performs automatic judgment, a sealing defect presence judger, and a display, judgment upon a non-destructive and non-contact inspection can be automated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: non-destructive inspection subject conveyer
20: ultrasonic wave generator
21: ultrasonic pulse generator-transmitter
22: preamplifier
23: ultrasonic pulse generation signal receiver
24: transmission probe
25: receiving probe
30: interface
40: ultrasonic wave generation data controller
50: sealing defect presence judger
51: bubble judger
52: width judger
60: display

The invention claimed is:

1. A non-destructive inspection judgment system for inspecting sealing of a non-destructive inspection subject using ultrasonic waves, the non-destructive inspection judgment system comprising:
an ultrasonic wave generator formed of probes and configured to transmit and receive ultrasonic signals by generating ultrasonic waves to the non-destructive inspection subject placed on an inspection table;
an interface configured to transmit an ultrasonic signal received from the ultrasonic wave generator to an ultrasonic wave generation data controller;
the ultrasonic wave generation data controller configured to process ultrasonic wave data received from the interface;
a sealing defect presence judger configured to judge, using the processed ultrasonic wave data, whether a sealing defect is present; and
a display configured to display a result of the judgment on a monitor,
wherein the non-destructive inspection subject is an aluminum pouch, and the non-destructive inspection judgment system is configured to perform automatic judgment in a non-destructive inspection of the sealing of the aluminum pouch including inspecting at least one of a side and a bottom of the aluminum pouch after final sealing of the aluminum pouch is performed, and inspecting at least one of a side and a bottom of the aluminum pouch after degassing and resealing are performed.

2. The non-destructive inspection judgment system of claim 1, wherein the ultrasonic wave generator, comprising:
an ultrasonic pulse generator-transmitter configured to generate ultrasonic waves and irradiate the non-destructive inspection subject with an ultrasonic signal;
a preamplifier configured to amplify an output of the ultrasonic signal from the ultrasonic pulse generator-transmitter; and
an ultrasonic pulse generation signal receiver configured to receive the amplified ultrasonic signal and transmit the received ultrasonic signal to the interface.

3. The non-descriptive inspection judgment system of claim 1, wherein further comprises a non-destructive inspection subject conveyor configured to convey the non-destructive inspection subject to the inspection table.

4. The non-destructive inspection judgment system of claim 1, wherein the probes of the ultrasonic wave generator comprise a set of a transmission probe and a receiving probe.

5. The non-destructive inspection judgment system of claim 1, wherein non-destructive inspection items comprise a sealing width length and a length of a temporarily attached part including polybeads.

6. The non-destructive inspection judgment system of claim 1, wherein measurement items of the inspection comprise a sealing width length and a size of bubbles.

7. A non-destructive inspection judgment system for inspecting sealing of a non-destructive inspection subject using ultrasonic waves, the non-destructive inspection judgment system comprising:
an ultrasonic wave generator formed of probes and configured to transmit and receive ultrasonic signals by generating ultrasonic waves to the non-destructive inspection subject placed on an inspection table;
an interface configured to transmit an ultrasonic signal received from the ultrasonic wave generator to an ultrasonic wave generation data controller;
the ultrasonic wave generation data controller configured to process ultrasonic wave data received from the interface;
a sealing defect presence judger configured to judge, using the processed ultrasonic wave data, whether a sealing defect is present;
a display configured to display a result of the judgment on a monitor;
a bubble judger configured to set inspection regions at bottom, left, and right portions by moving two horizontal and vertical shafts of the inspection regions of ultrasonic inspection equipment to set judgment reference values; and
a width judger configured to measure sections at positions of 20 shafts at bottom, left, and right portions of the inspection regions in the ultrasonic inspection equipment and convert a length of a section having a specific output value or larger from among the measured sections into a width.

8. The non-destructive inspection judgment system of claim 7, wherein, in the ultrasonic inspection equipment, a frequency of each of the transmission probe and the receiving probe is 715 kHz or 800 kHz.

9. A non-destructive inspection judgment system for inspecting sealing of a non-destructive inspection subject using ultrasonic waves, the non-destructive inspection judgment system comprising:

an ultrasonic wave generator formed of probes and configured to transmit and receive ultrasonic signals by generating ultrasonic waves to the non-destructive inspection subject placed on an inspection table;

an interface configured to transmit an ultrasonic signal received from the ultrasonic wave generator to an ultrasonic wave generation data controller;

the ultrasonic wave generation data controller configured to process ultrasonic wave data received from the interface;

a sealing defect presence judger configured to judge, using the processed ultrasonic wave data, whether a sealing defect is present; and a display configured to display a result of the judgment on a monitor, wherein types of sealing failures of the non-destructive inspection subject comprise leakage in which a natural electrolyte is generated and a gas leakage phenomenon occurs, and ventilation in which an electrolyte is generated due to an internal pressure of a cell of the non-destructive inspection subject and a gas leakage phenomenon occurs, and wherein the non-destructive inspection subject is a packaged pouch, and wherein sealing states in accordance with the types of sealing failure comprise a state in which sealing is weak and thus boundaries of polypropylene (PP) welding surfaces at upper and lower parts of the packaged pouch are stripped, a state in which a sealing section due to side trimming is not present and thus a PP welding part is not present, and a state in which sealing is excessive and thus a PP layer has been stripped from an aluminum layer of the packaged pouch after a crack occurred in the polybeads of the temporarily-attached part.

* * * * *